(12) United States Patent
St. Clair et al.

(10) Patent No.: US 9,628,412 B2
(45) Date of Patent: Apr. 18, 2017

(54) SYSTEM AND METHOD FOR GENERIC LOOP DETECTION

(71) Applicant: salesforce.com, inc., San Francisco, CA (US)

(72) Inventors: Brian St. Clair, Lutz, FL (US); Joseph Humphreys, St. Petersburg, FL (US)

(73) Assignee: salesforce.com, Inc., Sane Francisco, CA (US)

(*) Notice: Subject to any disclaimer, the term of this patent is extended or adjusted under 35 U.S.C. 154(b) by 567 days.

(21) Appl. No.: 13/889,291

(22) Filed: May 7, 2013

(65) Prior Publication Data
US 2013/0304833 A1 Nov. 14, 2013

Related U.S. Application Data

(60) Provisional application No. 61/643,957, filed on May 8, 2012.

(51) Int. Cl.
*G06F 15/16* (2006.01)
*H04L 12/58* (2006.01)

(52) U.S. Cl.
CPC ............. *H04L 51/00* (2013.01); *H04L 51/02* (2013.01); *H04L 51/12* (2013.01)

(58) Field of Classification Search
USPC ................. 709/206, 201, 202, 203
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |

(Continued)

*Primary Examiner* — Lan-Dai T Truong
(74) *Attorney, Agent, or Firm* — Blakely, Sokoloff, Taylor & Zafman LLP (57) ABSTRACT

A system and method for detecting generic loops is described. In one example, an inbound email is inspected for a loop token. If a loop token is found, then an event identification and a sender identification is extracted. The extracted sender identification and event identification is applied to a loop token record, and the inbound email is conditionally discarded based on the application to the loop token record.

23 Claims, 6 Drawing Sheets

(56) References Cited

U.S. PATENT DOCUMENTS

| | | |
|---|---|---|
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 9,177,293 B1 * | 11/2015 | Gagnon ............... G06Q 10/107 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0191969 A1 * | 10/2003 | Katsikas ............... G06Q 10/107 726/12 |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0210640 A1 * | 10/2004 | Chadwick ............... H04L 51/12 709/207 |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0289149 A1 * | 12/2005 | Carro ................... G06Q 10/107 |
| 2006/0041505 A1 * | 2/2006 | Enyart ................. G06Q 20/102 705/40 |
| 2006/0123083 A1 * | 6/2006 | Goutte ................. G06Q 10/107 709/206 |
| 2006/0212522 A1 * | 9/2006 | Walter .................... H04L 51/30 709/206 |
| 2008/0082658 A1 * | 4/2008 | Hsu ........................ H04L 51/12 709/224 |
| 2008/0270545 A1 * | 10/2008 | Howe .................. G06Q 10/107 709/206 |
| 2010/0229237 A1 * | 9/2010 | Rusche .................... H04L 51/12 726/22 |
| 2012/0110672 A1 * | 5/2012 | Judge ..................... H04L 51/12 726/25 |

* cited by examiner

FIG. 5

SYSTEM AND METHOD FOR GENERIC LOOP DETECTION

CLAIM OF PRIORITY

This application claims priority to Provisional U.S. Patent App. No. 61/643,957, filed on May 8, 2012, entitled "System and Method for Generic Loop Detection," which is incorporated herein by reference in its entirety and for all purposes.

FIELD

The present description relates to the field of detecting loops in electronic messaging and, in particular, to detecting loops in inbound and outbound messages.

BACKGROUND

An email loop may occur when outbound email from any email, chat, forum, meeting room, or other type of notification service is automatically replied to by a recipient or by a notification service. The loop occurs when a user has an auto-reply and the service continues to notify others about the auto-reply or when two users have an auto-reply and continue to reply to each other automatically. The auto-reply is handled by the system and results in additional outbound email, which is automatically replied to again, and so on.

The potential for loops is created when any event occurs that results in the system sending outbound email. Examples of events include a user posting to Chatter™ (a messaging service of salesforce.com, inc.), an entity record being updated which has people following it, a customer initiating a support case via Email to Case (a service of salesforce.com, inc.), and the like.

As described herein, a loop is a series of replies from one or more recipients, however, the invention is not so limited. Loops may be recognized by identifying an inbound email as a reply to an outbound email, and further, to recognize the relatedness of a series of replies over time.

Loops may occur naturally as part of the normal back and forth interaction between the system and human recipients, for example, when a customer repeatedly replies to automated Email to Case notifications with additional information. Loops may also occur unintentionally, such as when an Out of Office (OOF) rule triggers automatic replies to anything and everything. Identifying automated loops versus "manual" or natural loops introduces a temporal aspect to identification. The temporal aspect may be a certain number of replies within a specific time period, a consistent time-to-respond over a period of time, a consistent response percentage over a period of time, etc.

BRIEF SUMMARY

A method and apparatus for identifying message looping is described. In one example, a loop token is added to tokens that can be used to compare sender and event information for different messages. The loop tokens can be retrieved from message and loops can be broken by discarding messages as appropriate.

While one or more implementations and techniques are described with reference to an embodiment in which protecting against attacks from outside content is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

The included drawings are for illustrative purposes and serve only to provide examples of possible structures and process steps for the disclosed techniques for integrating on-demand applications and remote jobs. These drawings in no way limit any changes in form and detail that may be made to implementations by one skilled in the art without departing from the spirit and scope of the disclosure.

DETAILED DESCRIPTION

Generic Loop Detection ("GLD") is intended to prevent degradation of a message or file serving service due to unlimited or uncontrolled email looping. Such looping may be caused by out-of-office replies, Email to Case notifications, etc.

Some of the described examples refer to Salesforce.com® services and offerings provided by salesforce.com, inc., but this disclosure is not limited to those systems. In an example, salesforce.com offerings process almost two million inbound emails daily, and that volume is expected to increase dramatically in the near future. If 5% of these emails represent unnecessary loops, then 100,000 emails per day may be avoided. In addition, the power of a denial of service attack can more easily be reduced.

Based on whether or not the email or other messaging system or service will respond directly to the sender when a reply is received for a specific type of inbound email, and based on the number of recipients who are "looping", there are at least four different looping scenarios.

Figure 1A:
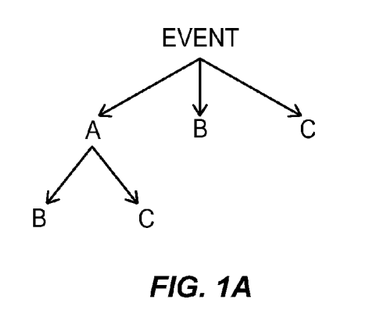
FIG. 1A is a diagram of a directed graph of a sequence of messages with automatic replies and no loops in which senders are shown as nodes in accordance with one implementation.

A first scenario, shown in FIG. 1A, does not generate a loop even though user A generates automatic replies. In the example of FIG. 1A, an event triggers notifications, such as e-mails, to be sent to three users A, B, and C. The service does not notify the sender, but recipient A sends an automatic reply to the notification service. The notification service then notifies B and C. Recipient A's message may be an OOF (Out-Of-Office) reply, which is processed by the email service. Because the service does not notify the sender A, no loop is created. A similar scenario could also occur if A automatically replied directly to B and C, but B and C did not reply back to A. The messages of B and C are not considered in order to simplify the drawing. If B is set to reply in the same way as A, then there will be multiple nested loops and the number of unnecessary messages will become large very quickly.

Figure 1B:
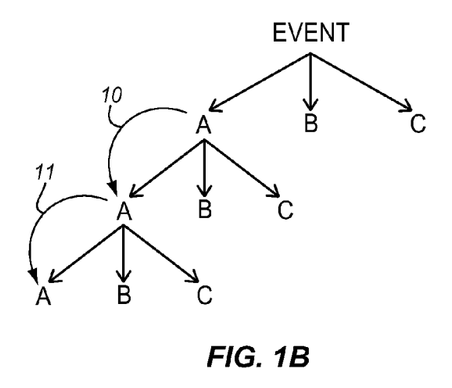
FIG. 1B is a diagram of a directed graph of a sequence of messages with automatic replies and one loop as in accordance with one implementation.

A second scenario, shown in FIG. 1B, does generate a loop based on A's automatic replies. In this scenario, an event occurs which results in notification emails to recipients A, B, and C. Recipient A sends an OOF reply back to the service, which is processed by the email service. This automatic reply results in notification emails to A, B, and C. A loop is created here, as recipient A will reply to the first OOF notification 10 with another OOF reply 11, which will be processed by the email service, which will send more notifications, etc., etc.

Notice that in this case, the service notifies A that it has received A's message. This, in turn, cause A to send another message to the service. Such a scenario may occur in a customer support ticketing system. The service may notify the customer A that its request has been moved to a new status. The customer's then automatically replies, and the service sends another notification. In an alternative scenario, A has automatically copied itself in the messages. This may be a rule that A or an administrator has set for all messages or only for automatic replies. It is this automatic copy from A 10 back to A 11 that causes the loop.

Figure 1C:
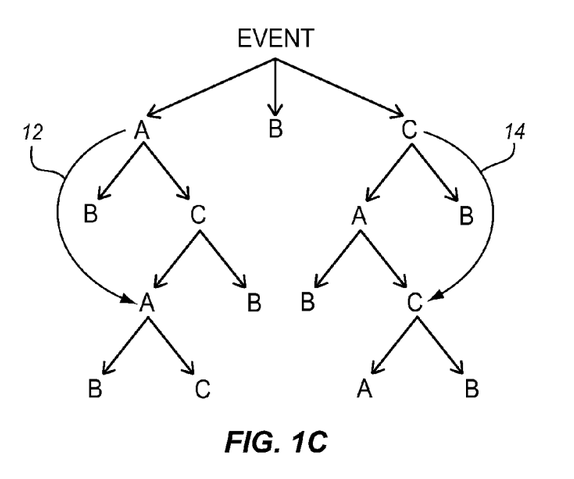
FIG. 1C is a diagram of a directed graph of a sequence of messages with automatic replies and two loops in accordance with one implementation.

A third scenario, shown in FIG. 1C, has two or more loopers, even though the service does not notify the sender. The event occurs and notifications are sent to A, B, and C. None of these users automatically copy themselves on automatic replies, so the loop of FIG. 1B does not occur. However, A and C both automatically reply to each other. Because there are multiple loopers (in this simple case, 2), A and C will alternate back and forth, with each looper's reply triggering an auto-response from the other looper. A's reply is sent to C, which replies to A creating a first loop 12 between A and C. In the same way C's reply is sent to A which replies to C creating a second loop 14 between C and A.

Another scenario, not shown, can occur when there are two or more loopers, and the system also sends notifications to the sender. This is a combination of the scenarios shown in FIGS. 1B and 1C. Loops will occur for each looper looping with itself, and for each unique pair of loopers, with each reply from one triggering a notification and subsequent reply from the other, back and forth.

Particularly in cases where there are many email recipients involved, as with a Reply to Chatter, a looping user will be replying to any and all notifications (including those generated due to other loopers). A combination of these two scenarios with many users can quickly cause a very large number of unnecessary messages to be generated in very little time.

Identifying Loopers

A generic approach may be used to remedy looping caused by automatic replies, and this approach can be applied across all types of email or network services that involve email notifications and similar types of interactions. Loop state information may be captured in such a way that it can be contained and propagated in the emails themselves, for example in email headers such as Message-ID and In-Reply-To fields. The loop state information may be used to minimize database reads and writes to generate the messages.

Figure 2A:
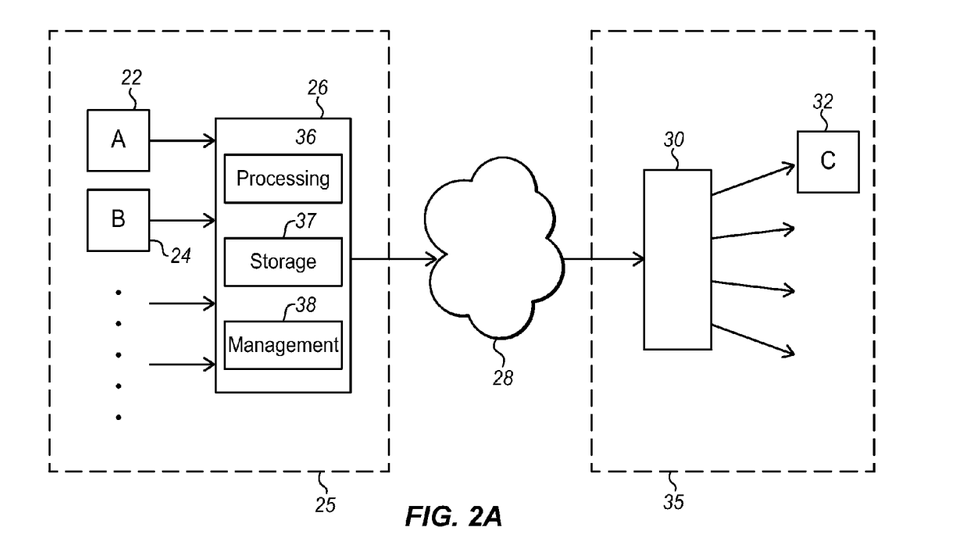
FIG. 2A illustrates a representative system for message communication in accordance with one implementation.

FIG. 2A is a simplified diagram of an environment in which users send emails between email clients using different domains. Clients A and B 22, 24 belong to a first email domain 25 that is served by one or more email servers or email clients 26. While only two clients are shown, there may be many more. Outbound emails start at a client terminal 22 and are sent to the email server 26. The email server includes processing logic 36 to classify inbound and outbound messages, to route the messages, detect and act on detected loops, and to provide any other message processing. The processing logic analyzes headers and fields of received messages such as destination, source, In-Reply-To, Message-ID, Content Type, Date, and any other fields. The payload is used with stored information corresponding to loop information and blacklists, to determine if the message to be forwarded, modified, or discarded.

The email server also contains storage logic 37 which may be volatile and/or non-volatile memory implemented within the server and used by the processing logic 36. This may be used to store loop tokens, loop context, time windows, blacklists, parameters, and other information used in detecting and handling loops. The email server also includes management logic 38 to provide chassis management, path routing management and internal system configuration using the storage logic. Together this logic performs outbound processing including routing, adding headers, and other functions and then sends the outbound email to the appropriate destination domain. In the illustrated example, the email is received at an email server 30 at a destination domain 35 and is subjected to inbound processing. The email server of the second domain may be similar to or different from that of the first domain. The inbound processing may include the looping processes described herein as well as security and administration functions. If the email has been properly addressed to a member of the second domain such as a client C 32, then the inbound email is sent to the addressed client, client C.

The two domains are shown as being coupled through the cloud 28, but they may instead be coupled directly through a Local, Metropolitan, or Wide area network in any other manner, depending on the particular implementation.

Figure 2B:
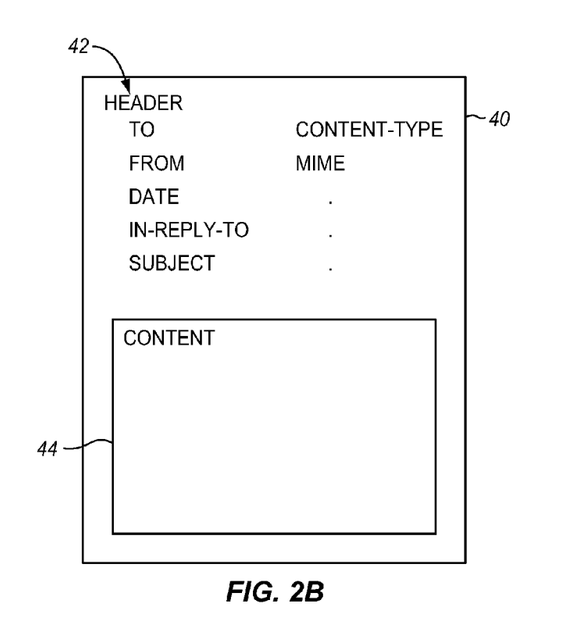
FIG. 2B illustrates a representative message in accordance with one implementation.

FIG. 2B is an example of a message. The message 40 has a header 42 and content 44. The header may include any of a variety of different fields. In the illustrated example, these fields include TO, FROM, DATE, MESSAGE-ID, IN-REPLY-TO, SUBJECT, CONTENT-TYPE, MIME, etc. These fields are commonly used for SMTP (Simple Mail Transfer Protocol) messages sent over IP (Internet Protocol), however, the particular fields used for any particular message may vary depending on the particular message type. Some message servers add additional fields and some security devices, such as firewalls also add additional fields. The content 44 may include text, images, additional files, and links to other content and other types of items, depending on the particular implementation. While the present description is in the context of email sent according to SMTP, the invention is not so limited. The system and methods described herein may be adapted for use with a variety of different message types and formats.

The diagrams of FIGS. 1B and 1C allow loops to be detected by analyzing the flow of messages. In particular situations, there may be potentially thousands of individual loops with many recipients involved. Loops can also be detected by detecting the users that are sending auto-replies. Once looping users are identified, then subsequent emails from those users can be handled appropriately in a way that protects other users of the service that are not auto-replying. As described below, looping users are identified and then an action is taken to stop or interrupt the loop.

According to one or more implementations, the strategy for identifying looping recipients may generally involve looking at patterns in a directed graph of responses and replies spawned by a specific event over a fixed period of time. In this graph, each node represents an outbound email to a specific recipient. Edges of the graph originating from a node represent subsequent outbound emails to specific recipients generated, directly or indirectly, in response to an auto-reply from the recipient associated with the node. The root node of the graph represents the initial event which triggered the very first outbound emails. FIGS. 1A, 1B, and 1C represent such directed graphs.

Each path in this directed graph is uniquely identifiable by an ordered list of the recipients at each node in the path. The temporal aspect of automated loop detection may be provided for by associating a timestamp with each edge. The timestamp may then correspond to the time at which the outbound email was sent. Paths can then be inspected within the context of a "loop window." The loop window may be used to define the length of time within which certain reply patterns are interpreted as automated loops.

Looping recipients may be identified by keeping track of the position of each email in the graph. If the system replies to the sender for a given type of inbound email, then loopers may be identified by a path covering some arbitrary number of nodes where the looper is always the one whose reply resulted in the additional notifications being sent (i.e. "AAAAAA..."). If the system does not reply to the sender for a given type of inbound email and there are multiple loopers, loopers may be identified by paths covering some arbitrary number of nodes where two of the loopers are alternating back and forth (i.e. "ABABAB..."). The presence of such a pattern identifies both recipients as loopers.

The Loop Token

To identify loopers and to track timing, a specially constructed string, referred to herein as a Loop Token, may be generated any time outbound email is sent. The token may be embedded in a suitable location, for example the message IDs (Identifications), of all outbound emails. The normal semantics of a standard SMTP (Simple Mail Transfer Protocol) Message-ID and In-Reply-To headers provide a mechanism for propagating the loop token across replies. When replying to an email under SMTP, senders are required to reference the message ID of the message they are replying to in their In-Reply-To header. When an inbound email is processed, the In-Reply-To header, for example, can be inspected to determine if the email is a reply to an outbound email. If it is, then the loop state information can be extracted from the loop token embedded in the header string (originally, the message ID of the outbound email). The loop state information can then be inspected to determine if the reply to the outbound email represents a loop.

In one or more implementations, the Loop Token is 58 characters long, broken down into six fixed-length fields, as shown in Table 1. The specific fields of a loop token, their size and order may be modified to suit any particular implementation. The values used to represent particular information may also be modified to provide more or less accuracy or detail. The particular types of techniques of encoding are provided only as examples. Different types of encoding may be used to suit different purposes or the information may be incorporated into the token with no encoding. In addition, different token structures may be used for different situations.

TABLE 1

| Field | Length | Name | Description |
|---|---|---|---|
| 1 | 5 | Event ID | Semi-unique, 5 character identifier for the initial event (the root node of the graph). |
| 2 | 22 | Penultimate Sender | A unique 22 character hash which identifies the next-to-last sender in the path. The hash is an MD5 hash of the sender's email address that is then Base 64 encoded using a web-safe Base 64 encoding (alphanumeric plus "—" and "_"). |
| 3 | 22 | Last Sender | A unique 22 character hash which identifies the last sender in the path. The hash is an MD5 hash of the sender's email address that is then Base 64 encoded using a web-safe Base 64 encoding (alphanumeric plus "—" and "_"). |
| 4 | 1 | Loop Counter | Tracks how many times the current pattern has been repeated (i.e. "A" or "AB" with the same sender(s)). One character, Base 36 encoded integer. The highest number that can be encoded is 35. |
| 5 | 6 | Start of Loop Window | Date/time which identifies the beginning of the period of time being examined for looping Six character, Base 36 encoded integer. To shorten the number of characters involved, the date is converted into its millisecond representation (via Date.getTime( )) and then the rightmost three characters of that value are truncated (the milliseconds, when the numeric value is |

TABLE 1-continued

| Field | Length | Name | Description |
|---|---|---|---|
| | | | converted into a Date). The resulting value is then encoded. During decoding, three zeroes are appended to the decoded string to return the Date/Time that was originally encoded, minus the milliseconds. |
| 6 | 2 | Last Reply Offset | Number of seconds since the start of the loop window that the last email reply was sent. Two character, Base 36 encoded integer. This number, added to the start of the loop window gives the date/time of the last reply in the current pattern. |

In one or more implementations, message IDs for outbound emails are constructed by taking the Loop Token and appending a unique string and an identifier of the domain that sends the outbound email. In the case of multiple identical loop tokens, because of coincidence or originating with the same event, the unique string allows the identical tokens to be differentiated. In one or more implementations, the unique string is a unique 22 character, Base 64 encoded string to guarantee that each message has a unique ID. The email source domain may be represented, for example, as "@sfdc.net" as follows:

{Loop Token}{22 character unique identifier}@sfdc.net.

The In-Reply-To headers of inbound SMTP reply emails contain the message ID enclosed in angle brackets as follows:

In-Reply-To: <{Message ID}>

Using In-Reply-To or another header, the Loop Token is able to track the last two nodes in the current path, the number of times the current "pattern" has been encountered, the event ID which identifies, essentially, which graph a particular node is on, and the date and time information which defines the window within which a certain number of replies may be considered to be a loop.

This information may be parsed out of the Loop Token during inbound email processing. It may be used to construct a Loop Token for any downstream, outbound email that might be generated. It may also be used to determine if the sender is looping or if any subsequent outbound email is looping.

Inbound Email Processing

For inbound emails which are replies, new nodes may be added to a directed graph during inbound email processing. The recipient, identified as a node on a particular directed graph, has received an outbound email from a messaging domain, e.g. Salesforce.com, and has replied to it. The inbound email reply may then be inspected to determine whether a following outbound email may or may not be sent to one or more recipients, or nodes on the directed graph.

When an inbound email is received, some or all of following actions are performed, according to one implementation of this disclosure:

(a) The In-Reply-To header of the inbound email is inspected to see if it contains a loop token string. If it does not, it is assumed that the email is not in reply to an outbound email and thus not part of an email loop. If the inbound email is not part of a loop, then it can be processed normally.

(b) If the inbound email does have a loop token string, then the loop token is extracted. The event ID is retrieved from the loop token, and a check is performed to see if the sender of the inbound email is blacklisted for the event on which they are replying. If the sender is blacklisted for the event, the inbound email is rejected and inbound email processing finishes. The inbound email is not delivered to any of its addressees.

(c) In addition to using the loop token to handle the inbound email, information obtained from inbound emails may be used to construct a new loop token. The new loop token may be used to apply other criteria to the inbound message. The new loop token may be constructed using just the loop token extracted from the inbound email plus the sender identified by the inbound email. More information may also be used, depending on the particular implementation. The new loop token is stored and may be used downstream to construct message IDs for any outbound emails that might be sent. The process of constructing the new Loop Token may take into account all of the loop state information from the old loop token, plus information about the current inbound email, such as the sender and the time that the inbound email was received.

The new loop token may have a loop counter field based on the sender information. This information may be examined to see if a looper or loopers have been identified. If loopers are identified, then they may be blacklisted for the event whose ID is embedded in the loop token. There may also be additional criteria used for blacklisting. After it is constructed, the new loop token may then be cached for use downstream.

Using a loop token as described above, a "loop detection" check may be done using the extracted loop token's loop counter, and looking at whether or not the looping pattern represents a single sender repeating (i.e. "AAAA") or two senders alternating or "ping ponging" (i.e. "ABAB")

Interrupting Loops (Blacklisting)

When a looper is identified, that user may be blacklisted for the event on which they are detected to be looping. A single sender may be blacklisted for multiple events, however, depending on the particular implementation, blacklisting is only done on a per-event basis. With this approach, blacklisting a sender for one event does not impact their status with respect to any other event.

A blacklist status may also be time constrained. With this approach, senders are blacklisted only for a predefined period of time. Once that time elapses, normal inbound email processing for that sender and event combination resumes. Of course, if another loop is identified then the sender may be blacklisted again for the same event. The time limit allows that in many cases, it is necessary only to break a loop. Once a loop is broken, it does not reoccur for the same combination of sender and event.

A notification email may be sent to senders each time they are blacklisted. The notification may indicate that the sender is temporarily blacklisted due to a high number of email replies on the same thread (a.k.a. event). The notification may be tracked to determine whether it generates a new loop, so that any such new loop is also stopped. While blacklisted, inbound email from the blacklisted sender for the event they are blacklisted for are discarded. This may be done with no bounce notification. While a sender may wish to be notified of being blacklisted, the bounce notification may create a loop in and of itself. If the blacklisted sender auto-replies to the bounce notification and this auto-reply then generates another bounce notification, then a new loop is established. Inbound emails from the same sender for an event that is not blacklisted are processed normally.

Outbound Email

For loop detection, loop state information that may be captured in inbound email loop tokens may be propagated in the message IDs of new outbound emails. Message ID generation is where loop detection intersects with outbound email sending.

A given event may spawn zero outbound emails, one outbound email, or thousands of outbound emails. Any outbound emails sent as the result of the same event contain the same loop state, that is the loop token identifies the same event and, for the first email, the same sender. A new context, MailLoopContext, may be used in some implementations to propagate loop state information in the form of the loop token from inbound email processing to outbound email message ID generation. At the end of inbound email processing, the new loop token generated based on the loop token of the inbound email, as described above, may be placed into the MailLoopContext for use downstream in constructing message IDs.

If an outbound email is sent as a result of something other than an inbound email being processed, there will be no loop state to propagate. In that case, a new loop token is created just for the outbound email and cached in the MailLoopContext when the first outbound email's message ID is constructed. That same loop token may be used by all other outbound emails sent from the same thread and based on the same event. The new loop token contains no sender information, but does contain a new, semi-unique, event ID, as well as date and time or timestamp information.

According to one or more implementations, the loop detection mechanism described herein is dependent upon correct propagation of the loop state from inbound email processing through to outbound email generation. The loop state, as reflected in the loop token and the cache, constructed during inbound email processing becomes part of the message IDs for any resulting outbound emails sent from the system. If loop state is not correctly propagated, then outbound emails may not reflect the correct loop state, and loop detection will fail when replies to those emails are processed on the inbound side. The loop token mechanism described herein may be used for both synchronous and asynchronous message processing systems.

Loop Token Construction

According to one or more implementations, loop detection occurs when loop tokens are extracted and manipulated during inbound email processing. The management of loop state across multiple outbound and inbound emails is shown and described below.

New Loop Tokens

New loop tokens may be created at the point of outbound message ID generation by, for example, the MailLoopContext. The loop token is created when a loop token is requested and there is no existing cached loop token for the message. A new loop token may be defined by the following fields as shown in Table 2. However, the particular fields and their structure and order may be adapted to suit different implementations. All of the above values are encoded and concatenated to create the Loop Token string, which becomes part of the message ID for every email which is sent, however, these particular encoding and concatenation methodologies are not required for the present invention.

TABLE 2

| | |
|---|---|
| event ID | A new, random event ID |
| Last Sender | Empty ("00000000000000000000000") |
| Penultimate Sender | Empty ("00000000000000000000000") |
| Start of Loop Window | Now |
| Last Updated | Now. Last Updated is represented in the Loop Token string as an offset (in seconds) from the Start of Loop Window, to preserve space. |
| Loop Counter | 0 |

Loop Token Manipulation

When an email is received that contains a valid loop token, a new loop token is created which incorporates the current date/time and the sender. The new loop token is inspected as part of the loop detection algorithm, and is also cached in the MailLoopContext for use as part of the message IDs of any downstream outbound emails.

The new loop token (NLT) may be created based on the old loop token (OLT) as follows:

1 NLT.PenultimateSender=OLT.LastSender

2 NLT.LastSender=Hash of current sender's email address 3.a If the loop pattern is not changed, NLT.LoopCounter=OLT.LoopCounter 3.b Otherwise, NLT.StartOfLoopWindow=OLT.LastUpdated 4.a NLT.LoopCounter++(if 3.a is not true, then NLT.LoopCounter is 0 prior to this step, now=1)

4.b If NLT.LoopCounter>LoopToken.MAX_COUNTER_VALUE (35) throw an exception

5 Calculate EndOfLoopWindow=NLT.StartOfLoopWindow+LOOP_WINDOW_IN_SECONDS

6 If Now>EndOfLoopWindow, reset all fields except event ID (date values default to Now)

The first operation to create the NLT is to take the last sender from the previous token (OLT) and make it the penultimate (next to last) sender for the new token. The impact of this is that for an alternating pattern, subsequent tokens will have the same two senders, but continually flip flop from the last sender to the penultimate sender and vice-versa. This provides the basis for comparing "loop patterns," as described below.

If the calculated EndOfLoopWindow is less than the current date/time, then the loop state is deleted and an empty token is returned. Essentially, too much time has elapsed between when the email was sent and when the reply was received, and the current email cannot be part of an existing loop. The current email might, however, be the start of a new loop. The new loop token's state at this point is equivalent to that of a "new" loop token. Only the event ID is carried forward.

The Loop Pattern

In one more implementations, the loop pattern is analyzed to detect looping, although it is not explicitly expressed as part of the loop token string. In one or more implementations, the loop pattern is an ordered list of the last two senders in the current path, then when a new loop token is created off of an existing loop token, the loop patterns from each can be compared to see if the overall pattern of senders has changed. This uses the loop pattern to detect looping.

The following non-limiting examples may help explain one or more implementations of using the loop pattern. Consider recipients A, B, and C, and the loop patterns over a series of email replies where the loop pattern is represented as XY, where X is the penultimate sender's identifier and Y is the last sender's identifier (and "0" means "no sender", as with a new token):

TABLE 3

| EVENT | Pattern | Counter |
| --- | --- | --- |
| Initial Loop Token | 00 (no sender information) | 0 |
| Sender A replies | 0A | 1 |
| Sender B replies | AB | 1 |
| Sender A replies | BA | 2 |
| Sender B replies | AB | 3 |
| Sender A replies | BA | 4 |

In the example of Table 3, two senders alternate back and forth. The pattern shows over time that the AB pattern flip-flops or alternates between AB and BA. This represents a pair of loopers in a multi-looper scenario. The third column is the running loop counter variable, incremented each time another occurrence of the same pattern is seen. In this context both AB and BA are seen as the same pattern.

TABLE 4

| EVENT | Pattern | Counter |
| --- | --- | --- |
| Initial Loop Token | 00 | 0 |
| Sender A replies | 0A | 1 |
| Sender A replies again | AA | 2 |
| Sender A replies again | AA | 3 |
| Sender A replies again | AA | 4 |
| Sender A replies again | AA | 5 |

In the example of Table 4, sender A is looping with itself. In this example, the counter interprets a "0A" pattern as the first iteration of a possible loop with just that sender. This allows a loop pattern to be detected sooner, but is not necessary to detect loops.

TABLE 5

| EVENT | Pattern | Counter |
| --- | --- | --- |
| Initial Loop Token | 00 | 0 |
| Sender A replies | 0A | 1 |
| Sender A replies again | AA | 2 |
| Sender B replies | AB | 1 |
| Sender A replies | BA | 2 |
| Sender C replies | AC | 1 |

The example of Table 5 shows multiple senders replying. Initially, it resembles a single sender loop with 0A, then AA. It also resembles two senders alternating with AB, then BA. Finally, it appears as if there might be two other senders alternating starting with AC. This is shown by the counter which never reaches a loop count that is higher than 2. In this case, the pattern changed three times, and each time the loop counter was reset.

Additional Circumstances

Slow loops may not be detected if time stamps are used. The detection approaches described herein work with the number of email replies that have been sent in a given period of time. If a recipient's response time is slow, then it is possible for two users to be looping, but the loop will not be detected because the governing limit on the counter will not be reached within the defined time period.

The time limits may be adjusted to also detect and block slow loops. This can have the effect of increasing the number of false positives. As an example, users may be identified as loopers who are instead sending multiple emails back and forth to each other. Alternatively, a greater amount of loop state could be maintained internally in order to detect longer term slow loop, but this increases the expense of the system.

For asynchronous outbound email, loop state may be propagated in outbound emails generated downstream of some "event." The event may be a previous reply in the potential loop. The outbound state may be propagated via the loop token. The loop token may be overtly, programmatically propagated across the asynchronous boundary. The asynchronous task can then establish a new MailLoopContext containing the loop token. This allows the asynchronous processing to successfully propagate loop state.

As an example, a loop token string can be passed via an enqueued MQ (Message Queue) message. The loop token and MailLoopContext can then be recreated when the message is dequeued. Notwithstanding the use of the MailLoopContext, loop detection might be inadvertently broken due to a failure to explicitly propagate loop state across the asynchronous boundary. This may be overcome for both synchronous and asynchronous systems by internally maintaining additional loop state at the email server or the email domain.

In some cases, a recipient's email client may not send the original Message-ID in the In-Reply-To header. If this happens, then the loop state will not be propagated and loop detection will not work. Such an email client idiosyncrasy is possible but is not common. While problematic, the idiosyncrasy can be overcome by removing any dependence on an email client's SMTP header usage and maintaining loop state in a separate location. This may result in not being able to connect a particular email with an event identifier, but the rest of the loop state information can be preserved. As in the case of asynchronous email, the information that is described as being carried by the loop token may instead be stored internally by the system to compensate for email clients that do not preserve headers. The additional loop state may be stored at a cache level, in a database, both, or on the MTA (Message Transfer Agent) somehow.

Processes

Figure 3A:
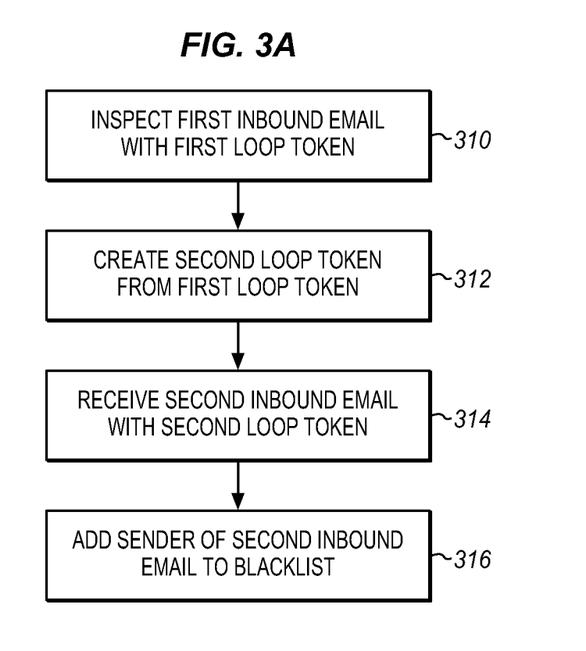
FIG. 3A is a process flow diagram of detecting generic loops in accordance with one implementation.

FIG. 3A shows an example process flow for detecting loops as described above. At 310 a first inbound email with a first loop token is inspected. The inspection may be done by an email server, an application server, or a special purpose email processing system. If the inbound email does not have a loop token, then this particular inspection is not necessary. However, the email may be inspected to generate information for the creation of a new loop token as described above. The data for the new loop token may be cached or stored in a mail loop context as described above, or elsewhere. The information from the first loop token and from the email generally is extracted and stored or cached, as described above. The first inbound email, after inspection, is forwarded to the addressee or to other processes for further inspection or processing.

At 312, a second loop token is created from the first loop token. The second loop token may include a counter, sender and addressee information, event identification and any of a variety of other information derived from the first loop token and the first inbound email.

At 314, a second inbound email is received that includes the second loop token. The second loop token will occur because the second loop token is in response or reply to an outbound email that contains the second loop token. The second loop token is inspected for its identification information. Receiving the second loop token in an inbound email typically indicates that there is a loop. As a result, at 316, the sender of the second inbound email is added to a blacklist Being added to the blacklist, additional emails from the same sender will be discarded and not forwarded on to the intended addressee. The blacklist, as mentioned above, may be limited to a particular event, a particular email thread, a particular amount of time, a particular number of round trips in a loop, or any other particular limitations. As mentioned elsewhere herein, a loop counter may be used to determine how many round trips have been traveled between sender and receiver based on a particular event. The loop counter may be used to discourage corrective action from being taken unless the sender and receiver continue to create new traffic. While it is possible to blacklist a user for a particular event after a single round trip, the counter allows several round trip loops to be tolerated before the blacklist is invoked. The numerical limits of the counter may be adjusted based on experience with the particular users involved.

Figure 3B:
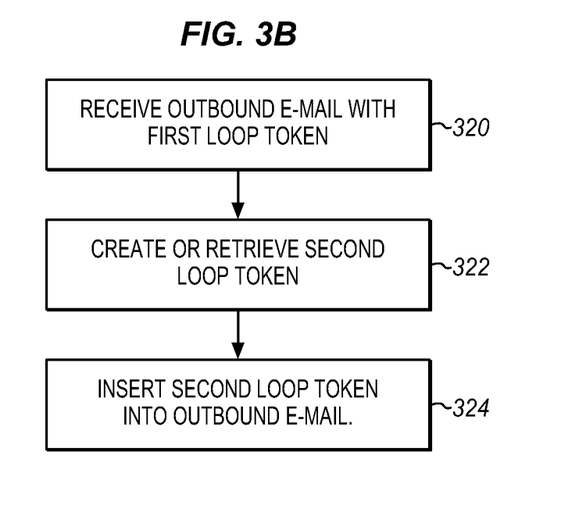
FIG. 3B is a process flow diagram of detecting generic loops in accordance with another implementation.

FIG. 3B shows another example process flow diagram that relates to outbound email processing as compared to the inbound email processing of FIG. 3A. This outbound email processing may be performed in the same email server or application server as the processing of FIG. 3A or inbound and outbound emails may be handled in different hardware. At 320 an outbound email is received. The outbound email is inspected and the results may be stored in a mail loop context. If the outbound email is a reply to an inbound email with the first loop token, then the outbound email will also include the first loop token. The presence of this token can be determined by inspection. If it is found, then a second loop token, such as the loop token of 314 of FIG. 3A may be inserted instead of, or in addition to, the first loop token. At 322, the second loop token is created or retrieved from, e.g. a mail loop context, and at 324, the second loop token is inserted into the outbound email. The outbound email is then sent for further processing or to its addressees.

Figure 3C:
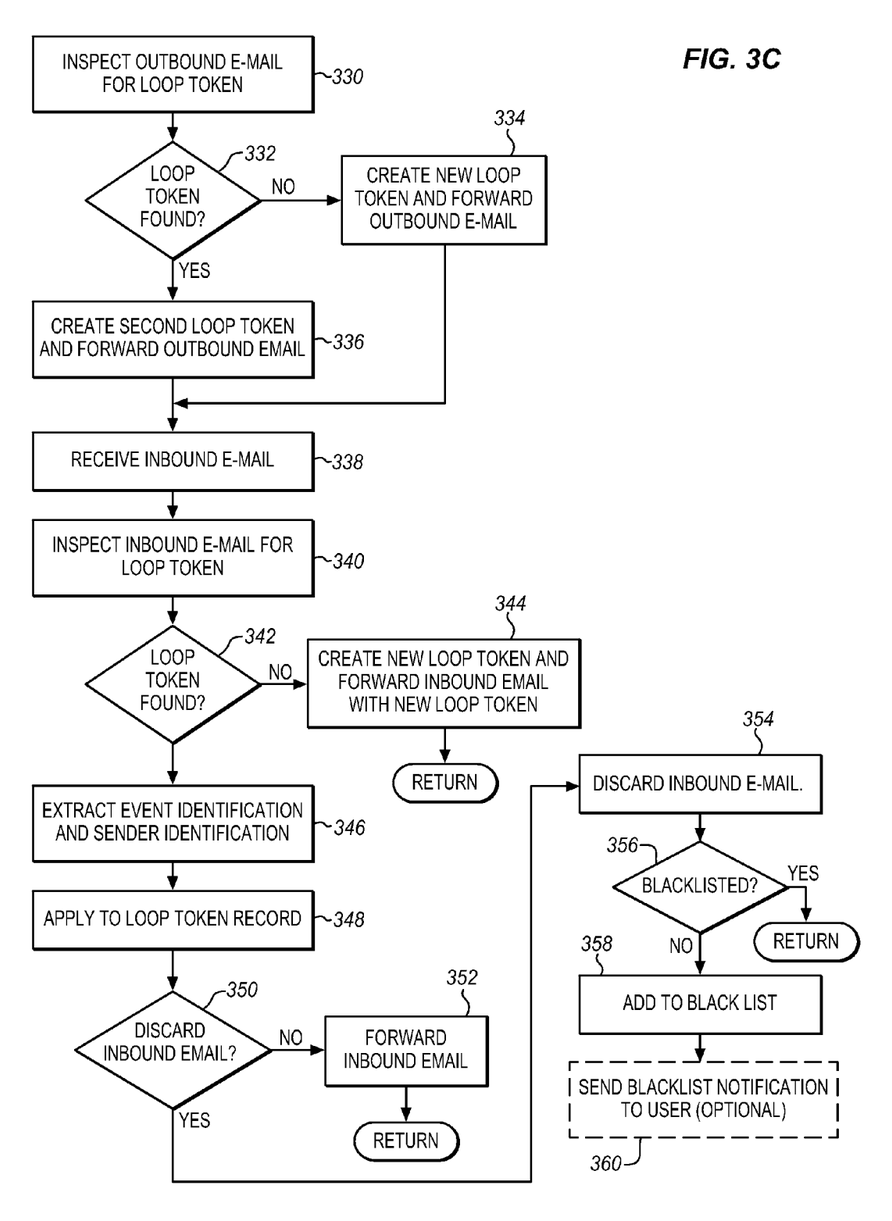
FIG. 3C is a process flow diagram of detecting generic loops in accordance with yet another implementation.

FIG. 3C is another example process flow diagram for detecting loops. The operations of FIG. 3C may be combined with those of FIGS. 3A and 3B. In some cases, the operations are the same as or overlap with those of FIGS. 3A and 3B. While the operations are shown as beginning with an outbound email and then receiving an inbound email, the order may be reversed or changed in other ways. There may be many inbound or outbound emails before an outbound or inbound email is received. The two emails, one inbound and one outbound, are shown as examples and represent only two of many emails that may be sent or received.

At 330 a system receives an outbound email and the outbound email is inspected for a loop token. Emails may be received at email servers, email clients, application servers, or other components of the system. At 332, the outbound email processing determines whether a loop token has been found. If a loop token is not found, then at 334, a loop token is generated and attached to the outbound email. The outbound email is then forwarded toward its addressee at 336. The loop token is generated as described above using sender, event, destination and other information. The token is then attached in a suitable field such as the In-Reply-To Field. As mentioned above, the In-Reply-To field has the benefits of being generally hidden to users and preserved by most email systems. However, a different field of the message may be used instead depending on the particular implementation. Different types of email standards and different types of messages may allow for the token to be attached in other locations.

At 336, if a loop token is found, then a second loop token is formed based on the found loop token and any information for the event and the sender that may be cached for example in a mail loop context. The loop token is inserted into the message and the message is then forwarded. At 338, if a loop token is not found, then a loop token that includes event and sender information is generated for the message and inserted into the message. The message is then forwarded to the addressee.

At 338 an inbound email is received and at 340, the inbound email is inspected to see if there is a loop token. In the described examples, this is done by inspecting an In-Reply-To header of the inbound email. However, a different location or locations may be inspected depending on the expected location of the token. If there is no loop token found at 342, then at 344 a loop token is created based on extracted user and event information and the email is forwarded to the addressee.

If a loop token is found at 342, then at 346, the event identification and sender identification and any other desired information is extracted from the loop token. The extracted sender identification may identify the last sender and the penultimate sender, the penultimate sender being a sender preceding the last sender from which the inbound email is received.

Using the extracted information, the email processing system can generate a loop state for the inbound email. The loop state may contain a sender identification and an event identification and any other desired information and then be stored in a cache such as the storage logic described above. When an outbound email is received such as at 330 or at another time, then when the outbound email is for an event stored in the cache, then the second loop token can be generated using the stored loop state. This second loop token may then be attached to the outbound email. This type of token may be the second loop token mentioned at 336.

Returning to the inbound email that includes a loop token, at 346 the extracted sender identification and event identification are applied at 348 to a loop token record. This record is stored in the cache and corresponds to a record generated when a prior email for the same event was received. Depending on the results of the comparison, the inbound email may be discarded at 350. The email may be discarded because the comparison indicates that the email is from a loop. In this case the sender may also be blacklisted. If the email is not part of a loop, then the email will not be discarded but forwarded to the addressee at 356.

The conditions for discarding an email may be adapted to suit different implementations. In some cases emails are discarded if the loop token record indicates that inbound emails are to be discarded that contain the extracted sender identification and event identification in a loop token. Inbound emails may also be discarded if the loop token contains a loop counter and the loop counter exceeds a predefined number of counts.

If at 350 the loop token is not to be discarded, then at 352, the email is forwarded. On the other hand, if at 350 the email is to be discarded, then at 354 the email is discarded. If the email is blacklisted, then the process continues to process other emails. The blacklist may be structured in a variety of different ways. As described above, each combination of sender identification and event identification can be a blacklist entry and each entry or each event may be subject to a time limit. If they are not on the blacklist at 356, then at 358 the sender and event identification can be added to the blacklist with or without a time stamp. The email is discarded and the sender is optionally notified at 360 that the message has been blacklisted.

In order to reduce the obtrusiveness of the blacklist, any of a variety of different restrictions may be placed on the blacklist. The loop state may contain a timestamp. After a specific time duration, for example, the sender may be removed from the blacklist for the event.

System Description

Figure 4:
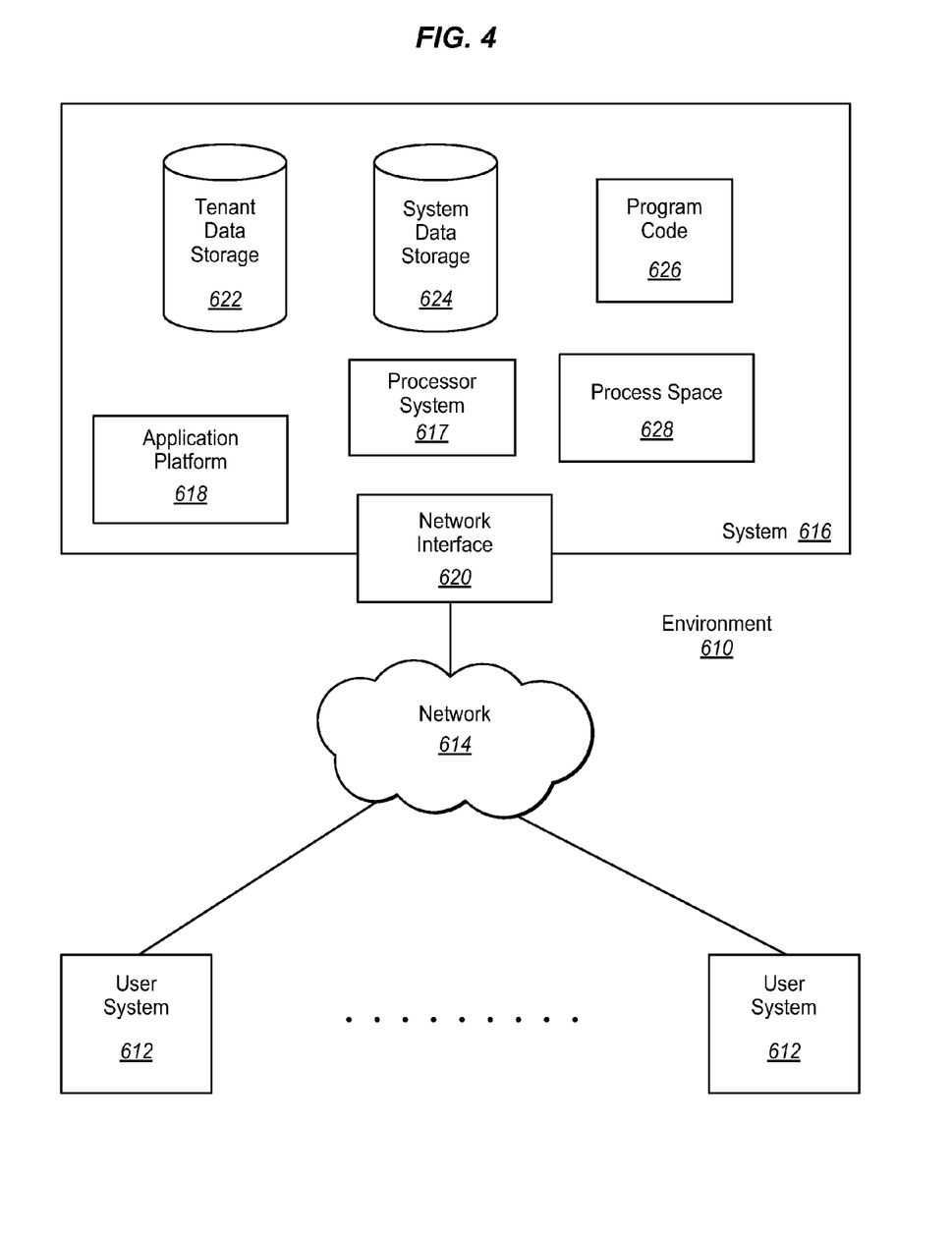
FIG. 4 illustrates a block diagram of an example of an environment wherein loop detection might be used.

FIG. 4 shows a block diagram of an environment 610 wherein generic loop detection might be used, in accordance with one implementation.

Figure 5:
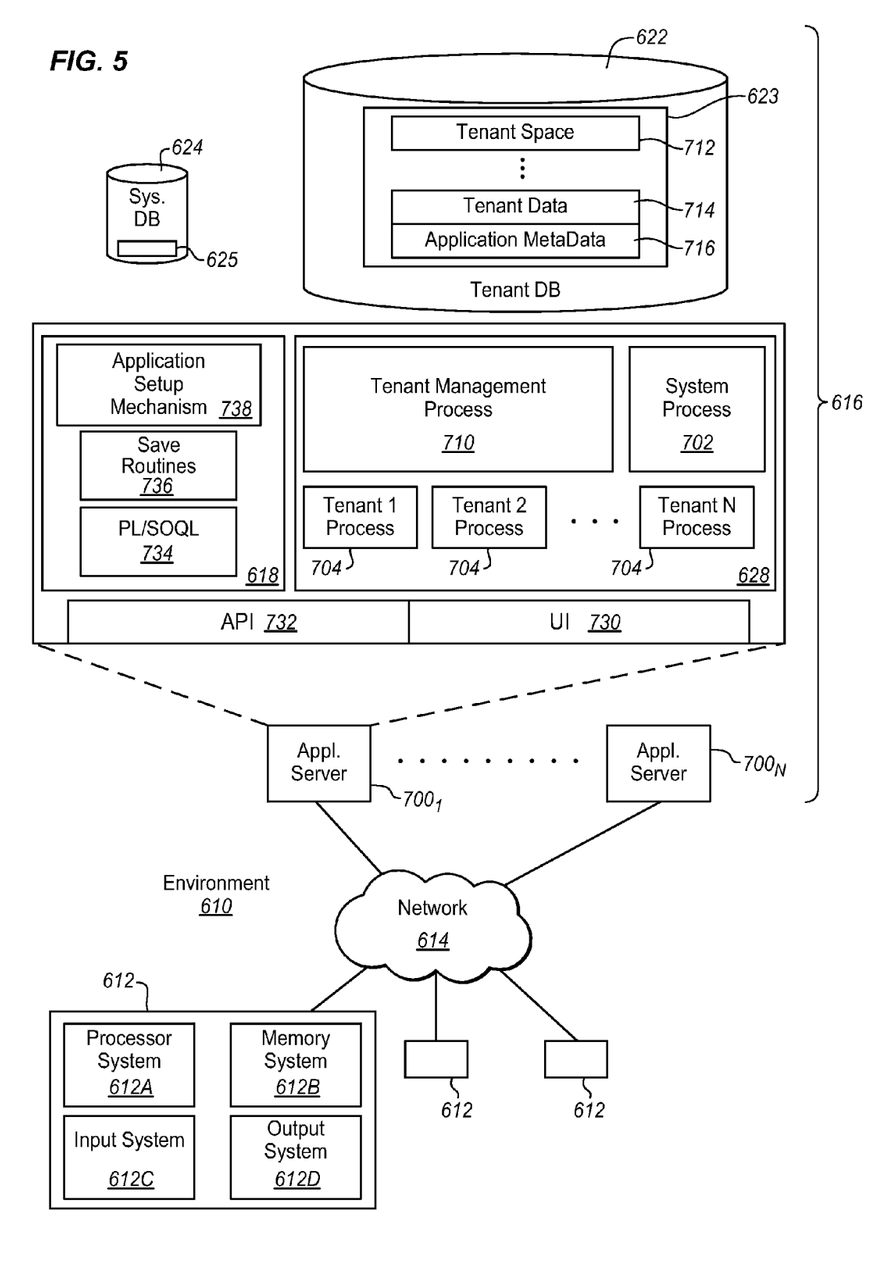
FIG. 5 illustrates a block diagram of an embodiment of elements of FIG. 4 and various possible interconnections between these elements.

Environment 610 includes an on-demand database service 616. User system 612 may be any machine or system that is used by a user to access a database user system. For example, any of user systems 612 can be a handheld computing device, a mobile phone, a laptop computer, a work station, and/or a network of computing devices. As illustrated in FIGS. 4 and 5, user systems 612 might interact via a network 614 with the on-demand database service 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS).

Accordingly, "on-demand database service 616" and "system 616" will be used interchangeably herein. A database image may include one or more database objects. A relational database management system (RDBMS) or the equivalent may execute storage and retrieval of information against the database object(s). Application platform 618 may be a framework that allows the applications of system 616 to run, such as the hardware and/or software, e.g., the operating system. In an implementation, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

One arrangement for elements of system 616 is shown in FIG. 4, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

The users of user systems 612 may differ in their respective capacities, and the capacity of a particular user system 612 might be entirely determined by permissions (permission levels) for the current user. For example, where a call center agent is using a particular user system 612 to interact with system 616, the user system 612 has the capacities allotted to that call center agent. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some implementations are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one implementation, system 616, shown in FIG. 4, implements a web-based customer relationship management (CRM) system. For example, in one implementation, system 616 includes application servers configured to implement and execute CRM software applications as well as provide related data, code, forms, web pages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain implementations, system 616 implements applications other than, or in addition to, a CRM application. For example, system 616 may provide tenant access to multiple hosted (standard and custom) applications. User (or third party developer) applications, which may or may not include CRM, may be supported by the application platform 618, which manages creation, storage of the applications into one or more database objects and executing of the applications in a virtual machine in the process space of the system 616.

Each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614.

Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, implementations are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one implementation, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units.

A computer program product implementation includes a machine-readable storage medium (media) having instructions stored thereon/in which can be used to program a computer to perform any of the processes of the implementations described herein. Computer code for operating and configuring system 616 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing implementations can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to one implementation, each system 616 is configured to provide web pages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 5 also shows a block diagram of environment 610 further illustrating system 616 and various interconnections, in accordance with one implementation. FIG. 5 shows that user system 612 may include processor system 612A, memory system 612B, input system 612C, and output system 612D. FIG. 5 shows network 614 and system 616. FIG. 5 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers 7001-700N, system process space 702, tenant process spaces 704, tenant management process space 710, tenant storage area 712, user storage 714, and application metadata 716. In other implementations, environment 610 may not have the same elements as those listed above and/or may have other elements instead of, or in addition to, those listed above.

User system 612, network 614, system 616, tenant data storage 622, and system data storage 624 were discussed above in FIG. 4. Regarding user system 612, processor system 612A may be any combination of processors. Memory system 612B may be any combination of one or more memory devices, short term, and/or long term memory. Input system 612C may be any combination of input devices, such as keyboards, mice, trackballs, scanners, cameras, and/or interfaces to networks. Output system 612D may be any combination of output devices, such as monitors, printers, and/or interfaces to networks. As shown by FIG. 5, system 616 may include a network interface 620 (of FIG. 4) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as Oracle™ databases.

Application platform 618 includes an application setup mechanism 738 that supports application developers' creation and management of applications, which may be saved as metadata into tenant data storage 622 by save routines 736 for execution by subscribers as tenant process spaces 704 managed by tenant management process 710 for example. Invocations to such applications may be coded using PL/SOQL 34 that provides a programming language style interface extension to API 732. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server 700 1 might be coupled via the network 614 (e.g., the Internet), another application server 700-N−1 might be coupled via a direct network link, and another application server 700 N might be coupled by yet a different network connection. Transfer Control Protocol and Internet Protocol (TCP/IP) are typical protocols for communicating between application servers 700 and the database system. However, other transport protocols may be used to optimize the system depending on the network interconnect used.

In certain implementations, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one implementation, therefore, an interface system implementing a load balancing function (e.g., an F5 Big-IP load balancer) is communicably coupled between the application servers 700 and the user systems 612 to distribute requests to the application servers 700. In one implementation, the load balancer uses a least connections algorithm to route user requests to the application servers 700. Other examples of load balancing algorithms, such as round robin and observed response time, also can be used. For example, in certain implementations, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each call center agent uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain implementations, user systems 612 (which may be client machines/systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. In some implementations, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more implementations and techniques are described with reference to an implementation in which a service cloud console is implemented in a system having an application server providing a front end for an on-demand database service capable of supporting multiple tenants, the one or more implementations and techniques are not limited to multi-tenant databases nor deployment on application servers. Implementations may be practiced using other database architectures, i.e., ORACLE®, DB2® by IBM and the like without departing from the scope of the implementations claimed.

Any of the above implementations may be used alone or together with one another in any combination. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A computer-implemented method for blacklisting an email sender, the computer having at least a processor and a memory, the method comprising:
    inspecting, by an email system, a first inbound email with a first token in the first inbound email;
    creating, by the email system, a second token from the first token, the second token having a counter, and inserting the second token in the first inbound email to replace the first token;
    receiving, by the email system, a second inbound email with the second token; and,
    adding, by the email system, a sender of the second inbound email to a blacklist and storing the blacklist at the email system.

2. The method of claim 1, further comprising:
    extracting an event identification and a sender identification from the first token of the first inbound email;
    applying the extracted sender identification and event identification to a token record; and
    conditionally discarding the first inbound email, by the email system, based on the applying of the extracted sender identification and event identification to the token record.

3. The method of claim 2, wherein conditionally discarding the first inbound email comprises discarding if the token record indicates that all inbound emails are to be discarded that have tokens containing the extracted sender identification and even identification.

4. The method of claim 2, wherein the extracted sender identification identifies a penultimate sender, the penultimate sender being a sender preceding a sender from which the first inbound email is received.

5. The method of claim 2, wherein the first token further comprises a loop counter and wherein the first inbound email is discarded if the loop counter exceeds a predefined number of counts.

6. The method of claim 2, wherein inspecting comprises inspecting an In-Reply-To header of the first inbound email.

7. The method of claim 2, further comprising:
    comparing the sender identification and the event identification against a. blacklist; and
    if the sender identification and the event identification are on the blacklist, then discarding the first inbound email.

8. The method of claim 7, wherein a sender is on the blacklist for a specific event.

9. The method of claim 8, wherein a sender is on the blacklist for a specific time duration.

10. The method of claim 7, further comprising removing the sender from the blacklist for the event after a specific time duration.

11. The method of claim 7, further comprising sending a notification to a user that the user is blacklisted for the specific event.

12. The method of claim 1, further comprising:
    inspecting an outbound email for a token before receiving the first inbound email; and
    creating the first token for the outbound email if the outbound email has no token, the first token identifying the sender of the outbound email using a sender identification and an event using an event identification.

13. The method of claim 12, wherein the first token further comprises a counter.

14. The method of claim 1, further comprising:
    generating a loop state for the first inbound email, the loop state containing a sender identification and an event Identification;
    storing the loop state in a cache of the email system;
    receiving an outbound email for an a specific event corresponding to the event identification after generating the loop state; and generating a second token based on the generated loop state and attaching the second token to the outbound email.

15. The method of claim 14, wherein the loop state further contains a timestamp.

16. The method of claim 1, further comprising receiving an outbound email with the first token and inserting the second token into the outbound email.

17. The method of claim 16, wherein the second inbound email is a reply to the outbound email.

18. A non-transitory computer-readable medium having instructions stored thereon that when executed cause a computer to perform operations comprising:
  inspecting a first inbound email with a first token in the first inbound email;
  creating a second token from the first token, the second token having a counter, and inserting the second token in the first inbound email to replace the first token;
  receiving a second inbound email with the second token; and
  adding a sender of the second inbound email to a blacklist and storing the blacklist at the email system.

19. The medium of claim 18, the operations further comprising receiving an outbound email with the first token and inserting the second token into the outbound email.

20. The medium of claim 19, wherein the second inbound email is a reply to the outbound email.

21. An email application server comprising:
  a network interface for connection to a plurality of email client terminals to receive an inbound email; and
  a processing unit includes a memory configured to execute functions of the email application server including to inspect a first Inbound email with a first token In the first inbound email, to create a second token from the first token, the second token having a counter, and insert the second token in the first inbound email to replace the first token, to receive a second inbound email with the second token, and to add a sender of the second inbound email to a blacklist and storing the blacklist at the email system.

22. The email application server of claim 21, wherein the processing unit is further configured to receive an outbound email with the first token and to insert the second token into the outbound email.

23. The email application server of claim 22, wherein the second inbound email is a reply to the outbound email.

* * * * *